United States Patent [19]

Ackermann et al.

[11] Patent Number: 5,418,414
[45] Date of Patent: May 23, 1995

[54] ELECTRIC MOTOR WITH PERMANENT-MAGNET EXCITATION

[75] Inventors: Bernd Ackermann; Leo Honds, both of Aachen, Germany; Ping-Shih Wang, Cheshire, Conn.

[73] Assignee: U.S. Philips Corporation, New York, N.Y.

[21] Appl. No.: 218,790

[22] Filed: Mar. 28, 1994

[30] Foreign Application Priority Data

Mar. 31, 1993 [DE] Germany .......... 43 10 226.3

[51] Int. Cl.[6] .......................................... H02K 21/12
[52] U.S. Cl. ................ 310/156; 310/67 R; 310/185; 310/254
[58] Field of Search ........... 310/67 R, 156, 254, 310/261, 116, 154, 185, 179, 186, 180

[56] References Cited

U.S. PATENT DOCUMENTS

| | | | |
|---|---|---|---|
| 3,132,270 | 5/1964 | Phelon | 310/156 |
| 4,217,508 | 8/1980 | Uzuka | 310/67 R |
| 4,280,072 | 7/1981 | Gotou et al. | 310/67 |
| 4,417,167 | 11/1983 | Ishii | 310/67 R |
| 4,540,906 | 9/1985 | Bloom | 310/67 R |
| 4,554,491 | 11/1985 | Plunkett | 310/186 |
| 4,742,258 | 5/1988 | Earle | 310/156 |
| 4,763,050 | 8/1988 | Ruppert | 310/156 |
| 4,882,511 | 11/1989 | von der Heide | 310/67 R |
| 5,220,227 | 6/1993 | Ohi | 310/67 R |
| 5,220,228 | 6/1993 | Sibata | 310/156 |
| 5,315,198 | 5/1994 | Toroh | 310/156 |

FOREIGN PATENT DOCUMENTS

| | | |
|---|---|---|
| 0052179 | 5/1982 | European Pat. Off. . |
| 149228 | 7/1985 | European Pat. Off. . |
| 2213611 | 8/1974 | France . |
| 0334149 | 3/1921 | Germany . |
| 2833208 | 2/1980 | Germany . |
| 2934183 | 3/1981 | Germany . |
| 3122049 | 7/1982 | Germany . |
| 3427994 | 1/1986 | Germany . |
| 148165 | 11/1981 | Japan . |
| 2091948 | 8/1982 | United Kingdom . |
| 2179205 | 2/1987 | United Kingdom . |
| 2218857 | 11/1989 | United Kingdom . |
| 8807285 | 9/1988 | WIPO . |

*Primary Examiner*—R. Skudy
*Attorney, Agent, or Firm*—Edward Blocker

[57] ABSTRACT

The invention relates to an electric motor with permanent-magnet excitation, particularly inside-rotor and outside-rotor motors, comprising motor sections (10, 20) which are movable relative to one another, of which the first motor section (10) forms a multi-pole excitation field in an air gap (1) by means of permanent magnets (11) and of which the second motor section (20) is a soft-iron yoke (21) having pole teeth (22) which project towards the air gap (1) and which carry excitation coils (23). The motor combines the following characteristic features:

a) the pole teeth (22) which project from the soft-iron yoke (21) of the second motor section (20) toward the air gap (1) are free from recesses at the location of the air gap (1), b) in the proximity of the air gap (1) the smallest distance between adjacent pole teeth (22) which project from the soft-iron yoke (21) of the second motor section (20) toward the air gap (1) is as small as is allowed by production, c) the transitional areas between areas with different directions of magnetisation of the permanent magnet (11) of the first motor section (10) extend parallel to the motor shaft, and d) the permanent magnet (11) of the first motor section (10) is magnetised in such a manner that the radial component of the magnetic field produced in the air gap (1) by this magnet varies approximately sinusoidally along the circumference of the motor.

4 Claims, 3 Drawing Sheets

ELECTRIC MOTOR WITH PERMANENT-MAGNET EXCITATION

BACKGROUND OF THE INVENTION

The invention relates to an electric motor with permanent-magnet excitation, particularly to inside-rotor and outside-rotor motors, comprising motor sections which are movable relative to one another, of which the first motor section forms a multi-pole excitation field in an air gap by means of permanent magnets and of which the second motor section is a soft-iron yoke having pole teeth which project towards the air gap and which carry excitation coils.

Such motors are known as rotation motors, for example from DE 28 23 208 C2 and from DE 31 22 049 C2. However, a problem of such motors is that their efficiency is low although the multi-pole excitation field in the air gap is formed without losses when the motor is stationary.

If these motors are used as drive motors in battery-operated apparatuses their low efficiency will reduce the total operating time attainable with one set of batteries. Regardless of the type of power supply the heat produced in the motor leads to thermal expansion of parts of the motor itself and parts of the apparatus being driven. This necessitates steps in order to prevent the correct operation of the driven apparatus from being impaired as result of these thermal expansions.

Such motors with permanent-magnet excitation exhibit losses in the form of copper losses in the excitation coils of the second motor section, which coils are arranged on pole teeth projecting from the soft-iron yoke towards the air gap, iron losses in the soft-iron yoke and in the pole teeth projecting towards the air gap, and iron losses in the soft-iron yoke connected to the permanent magnet of the first motor section.

On account of the rotation of the motor the two motor sections move relative to one another, as a result of which the magnetic fields in the soft-iron yokes vary in magnitude and direction. These fluctuations of the magnetic fields produce the iron losses in the soft-iron yokes. The copper losses in the excitation coils of the second motor section are caused by currents in these coils.

The magnetic fields of varying magnitude in the pole teeth projecting from the soft-iron yoke of the second motor section towards the air gap in conjunction with the currents flowing in the excitation coils produce, in known manner, the torque which is characteristic of the operation of such motors. Therefore, the losses caused by these magnetic fields and currents in the second motor section should be reduced only in such a manner that this does not lead to a reduction of the motor torque. The most important step in this respect is the use of magnetic steel sheets to laminate the soft-iron yoke of the second motor section in a direction perpendicular to the axis of rotation of the motor.

On the other hand, the magnitude and direction of the magnetic fields in the soft-iron yoke connected to the permanent magnet of the first motor section need not vary in order to generate the motor torque.

SUMMARY OF THE INVENTION

It is an object of the invention to minimise the iron losses in the soft-iron yoke connected to the permanent magnet of the first motor section.

According to the invention this object is achieved by the combination of the following characteristic features:
a) the pole teeth which project from the soft-iron yoke of the second motor section toward the air gap are free from recesses at the location of the air gap,
b) in the proximity of the air gap the smallest distance between adjacent pole teeth which project from the soft-iron yoke of the second motor section toward the air gap is as small as is allowed by production,
c) the transitional areas between areas with different directions of magnetisation of the permanent magnet of the first motor section extend parallel to the motor shaft, and
d) the permanent magnet of the first motor section is magnetised in such a manner that the radial component of the magnetic field produced in the air gap by this magnet varies approximately sinusoidally along the circumference of the motor.

By means of these steps it is possible to reduce the iron losses in the soft-iron yoke connected to the permanent magnet of the first motor section significantly and thereby improve the efficiency of the motor.

This is based on the combination of all the steps to be taken. The nonrecessed pole teeth provide a better linkage of the flux produced by the magnet to the flux from the stator coils. The close proximity of the adjacent pole tooth ends, i.e. the narrow slot openings, in combination with the sinusoidal magnetisation leads to a reduction of the detent torque. As a result of the non-oblique magnetisation axial forces are avoided.

The approximately sinusoidal shape of the magnetic field along the circumference of the motor is obtained when a magnet ring is magnetised with a customary pulse magnetisation device in such a manner that the currents in the magnetisation device flow only inside (outside) the magnet ring in the case of a ring for an outside rotor (inside rotor). This has the advantage that no further refinement is required. Thus, new motors can be developed more rapidly and the motor designs are less susceptible to tolerances.

In a further embodiment of the invention the smallest distance between circumferentially adjacent pole-tooth ends is smaller than 1.5 mm.

BRIEF DESCRIPTION OF THE DRAWINGS

The invention will now be described in more detail with reference to the drawings. In the drawings.

DETAILED DESCRIPTION OF THE PREFERRED EMBODIMENTS

Figure 1:
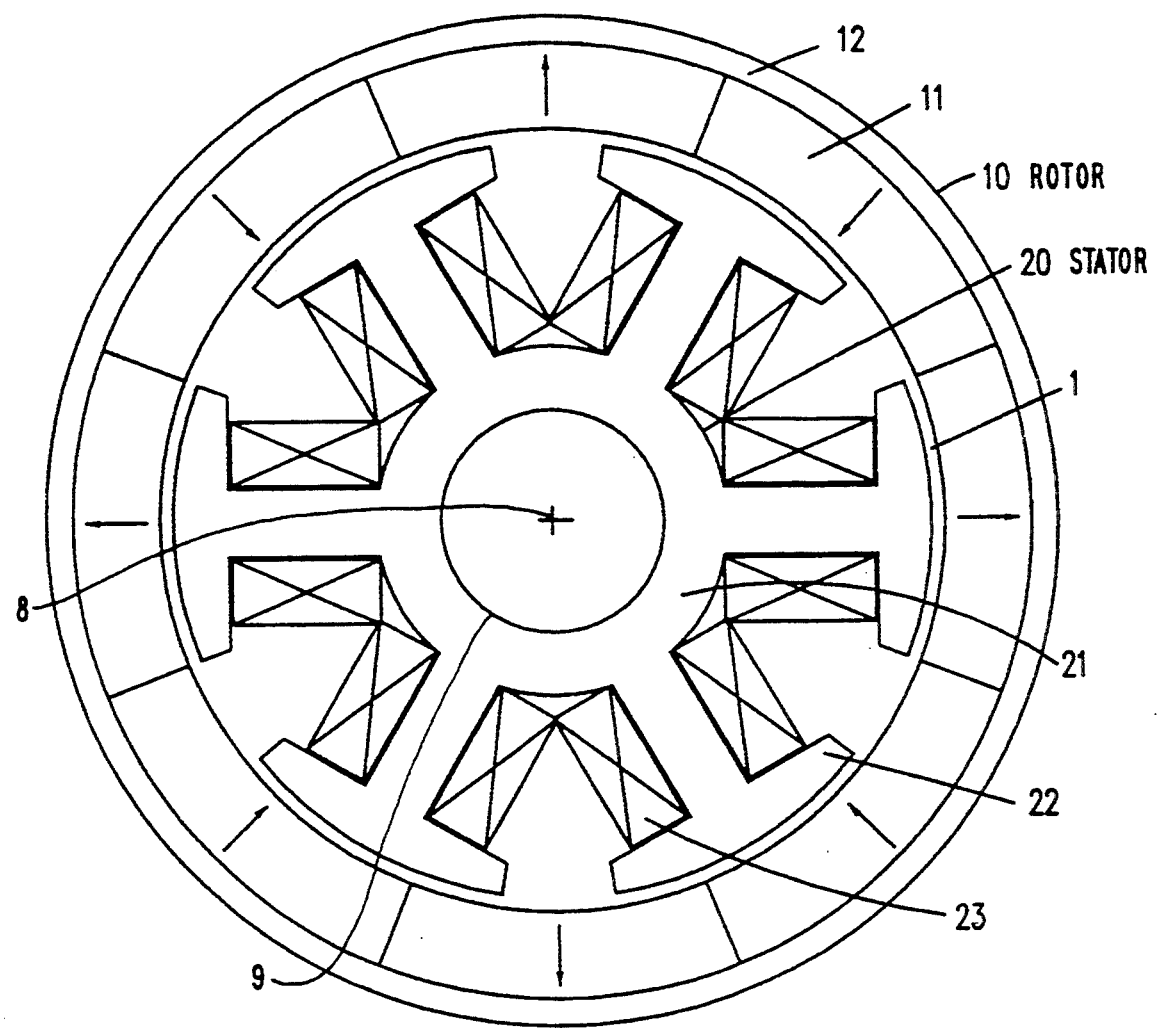
FIG. 1 is a sectional view of an electric motor with permanent-magnet excitation, which motor comprises eight poles excited by permanent magnets of the first motor section and six pole teeth projecting from the soft-iron yoke of the second motor section towards the air gap.

FIG. 1 is diagrammatic sectional view of an electric motor excited by means of permanent magnets. The motor has a first motor section 10 with a multi-pole permanent magnet 11 mounted in a soft-iron yoke 12 surrounding it. This first motor section is rotatable about a second motor section 20 and its supporting shaft 9 having an axis 8. This second motor section 20 has a soft-iron yoke 21 with pole teeth 22 projecting towards the air gap 1 and carrying excitation coils 23.

Figure 2:
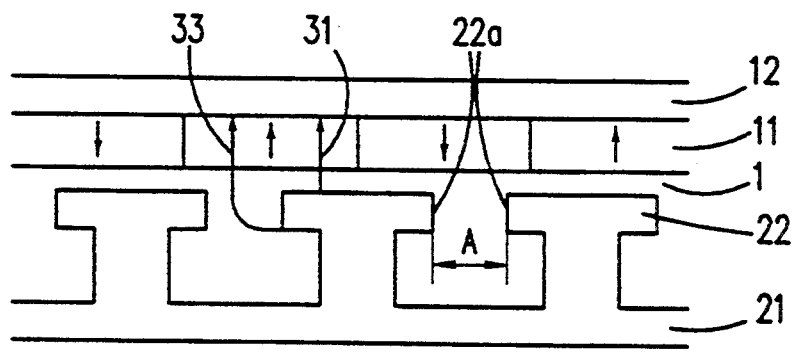
FIG. 2 is diagram showing two of field lines at the location of the air gap.
Figure 3:
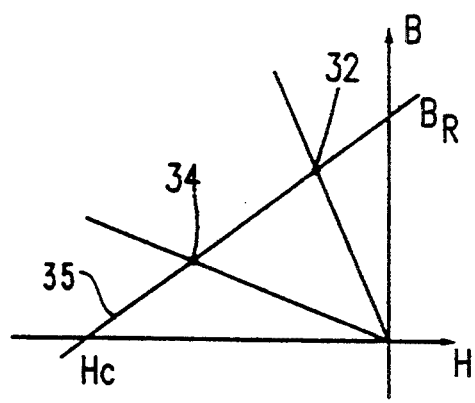
FIG. 3 shows the operating points of the permanent magnet which correspond to the two field lines shown in FIG. 2, B being the remanence and H being the coercive field strength.

FIG. 2 and FIG. 3 show how the iron losses arise in the soft-iron yoke 12 connected to the permanent magnet 11 of the first motor section 10. For field lines which, like the field line 31 in FIG. 2, extend in the air gap 1 at the location of the pole teeth 22 the effective magnetic resistance is comparatively low, as a result of which the operating point 32 of the permanent magnet 11 at this location is situated near the remanence, $B_R$, of the permanent magnet, as is shown in FIG. 3. Conversely, for field lines which, like the field line 33 in FIG. 2, extend in the air gap 1 at the location of a gap between two pole teeth the effective magnetic resistance is comparatively high, as a result of which the corresponding operating point 34 of the permanent magnet 11 at this location is situated far below the remanence $B_R$ of the permanent magnet, as is shown in FIG. 3 which shows the conventional B-H magnetization curve of a permanent magnet with operating characteristic 35 extending between its remanence $B_R$ and its coercive force $H_C$. If the motor sections 10 and 20 rotate relative to one another the operating point of the permanent magnet 11 at any location will fluctuate between the maximum values given by the operating points 32 and 33 in FIG. 3. The associated fluctuations in the magnitude of the magnetic field at the location of the soft-iron yoke 12 behind the relevant area of the permanent magnet 11 lead to iron losses at this location. In accordance with the invention these losses are largely eliminated by avoiding recesses in the pole teeth 22 at the air gap 1 and minimising the distances A between the circumferentially adjacent ends of the pole teeth 22 in the proximity of the aid gap 1. This is achieved in that the distance between the operating points 32 and 34 of the permanent magnet is minimised. The minimisation is governed by the mechanical manufacturing possibilities. The distance A should be as small as allowed by the production technology. In any case, the distance A should be smaller than 1.5 mm. It is necessary that the transitional areas between areas with different directions of magnetisation of the permanent magnet 11 of the first motor section 10 extend parallel to the motor shaft, and the permanent magnet 11 of the first motor section 10 is magnetised in such a manner that the radial component of the magnetic field produced in the air gap 1 by this magnet varies approximately sinusoidally along the circumference of the motor, in order to preclude the excitation of undesired oscillations of the motor.

The substantially sinusoidal variation of the magnetic field along the circumference of the motor is achieved when a magnet ring is magnetised with a customary pulse magnetisation device in such a manner that the currents in the magnetisation device should flow only inside (outside) the magnetic ring in the case of a ring for an outside rotor (inside rotor). This has the advantage that no further refinement is required. Thus, new motors can be developed more rapidly and the motor designs are less susceptible to tolerances.

Figure 4:
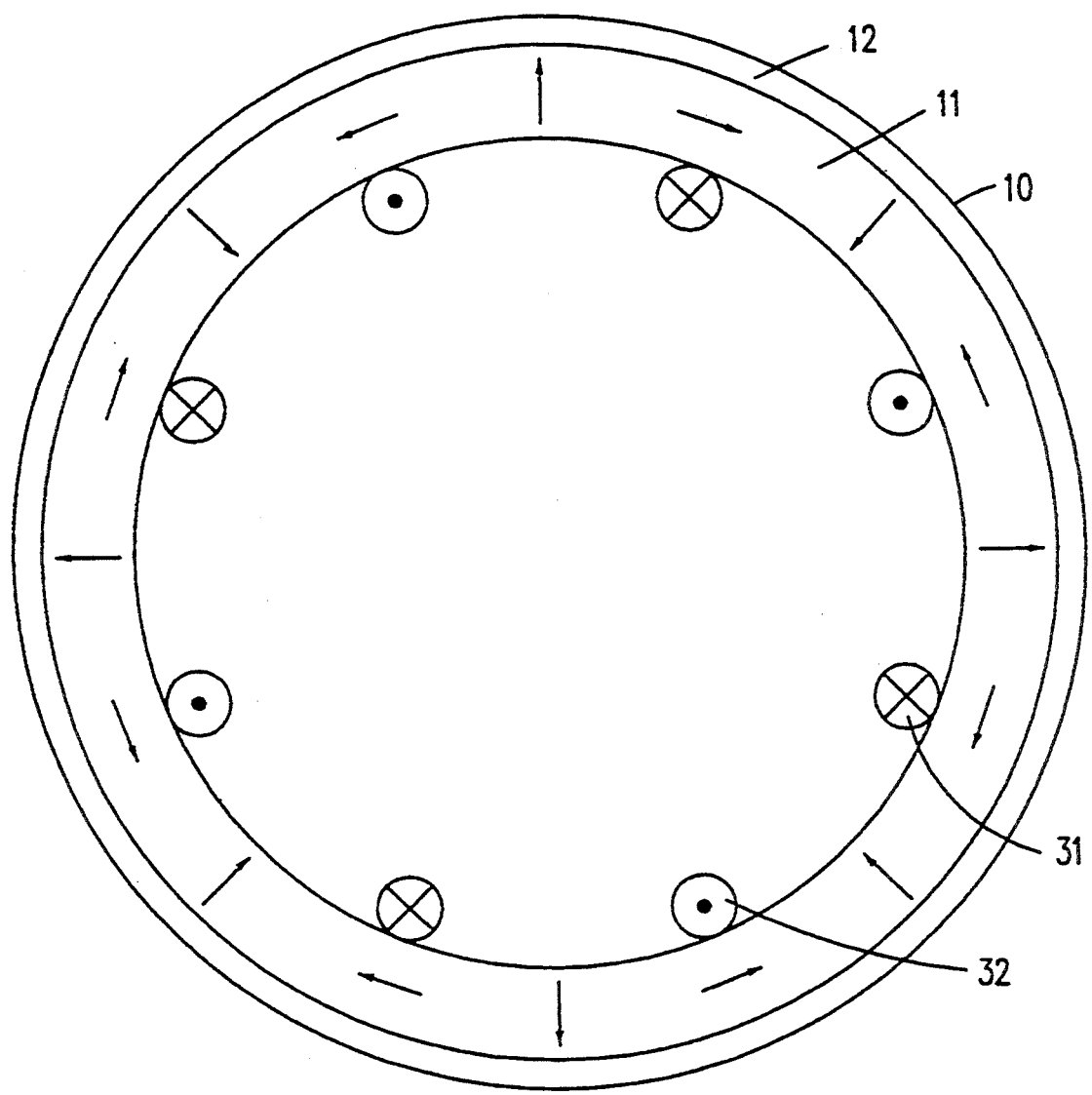
FIG. 4 shows a magnetisation device for the magnet ring of one motor section.

FIG. 4 shows an example of the magnetisation device. On its inner side the soft-iron yoke 12 of the motor section 10 is provided with an initially non-magnetised ring 11 of a magnet material. The numeral 31' refers to areas of the magnetisation device in which the magnetisation current flows into the plane of drawing. There are four of these areas. The numeral 32' denotes areas in which the magnetisation current flows out of the plane of drawing. Again there are four of these areas. The magnetisation currents are generated by means of a pulse magnetisation device. Arrows in the permanent magnet ring 11 indicate the direction of the resulting magnetisation.

We claim:

1. An electric motor with permanent magnet excitation comprising:
   (a) first and second motor sections rotatable relative to one another about an axis and having facing surfaces bordering a generally cylindrical air gap therebetween,
   (b) said first motor section comprising a permanent magnet member having adjacent segments magnetized radially in opposite directions to form a multipole excitation field in the air gap, areas of the permanent magnet member between oppositely magnetized segments extending substantially parallel to the axis, magnetization of the permanent magnet member being such that a magnetic field is produced in the air gap whose radial component varies approximately sinusoidally along a circumference of the air gap,
   (c) said second motor section comprising a soft-iron yoke with its facing surfaces bordering the air gap having circumferentially-spaced pole teeth which project toward the air gap and excitation coils on the pole teeth, said pole teeth being free from recesses along the surfaces bordering the generally cylindrical air gap, a smallest distance between circumferentially-spaced edges of adjacent pole teeth being smaller than 1.5 mm.

2. An electric motor as claimed in claim 1, wherein surfaces of the pole teeth that border the air gap are smooth and are uniformly spaced from the first motor section facing surfaces bordering the air gap.

3. An electric motor as claimed in claim 2, wherein said first motor section comprises a ring magnet surrounded by a soft-iron yoke.

4. An electric motor as claimed in claim 3, wherein said first motor section comprises a rotor surrounding the second motor section which comprises a stator.

* * * * *